Aug. 18, 1953        J. F. ZALESKI        2,649,544
MICROWAVE DETECTOR
Filed April 19, 1949

Inventor
JOHN F. ZALESKI

Patented Aug. 18, 1953

2,649,544

UNITED STATES PATENT OFFICE 2,649,544

MICROWAVE DETECTOR

John F. Zaleski, Queens Village, N. Y., assignor to General Precision Laboratory Incorporated, a corporation of New York Application April 19, 1949, Serial No. 88,269

9 Claims. (Cl. 250—31)

1

The present invention relates to a new and improved apparatus for the detection of microwaves.

This application is a continuation-in-part of copending application, Serial No. 4,869, filed January 28, 1948, of John F. Zaleski, now Patent No. 2,611,804, issued September 23, 1952.

When measuring the intensity of microwaves in wave guides it is usual to employ a detector to rectify or demodulate a portion of the microwave energy, using a conventional direct-current or low-frequency alternating-current meter to measure the rectified or demodulated energy. Since the latter is a function of the original microwave energy, the intensity of the latter can be ascertained therefrom.

Detectors heretofore available for the detection of microwaves have had at least three interdependent adjustments, so that their use has been laborious and the results uncertain. Any change in the circuit, the microwave characteristics or the components of the detector have necessitated a repetition of the laborious process of adjustment.

The present invention reduces the number of interdependent adjustments to two, and thereby the detector is qualitatively improved and its use is facilitated by much more than a proportionate amount.

The purpose of this invention therefore is to provide improved apparatus for the detection of microwaves.

For a more detailed understanding of this invention and of the specific objects attained by its use, reference should be had to the following descriptive matter and the accompanying drawings in which.

Figure 1:
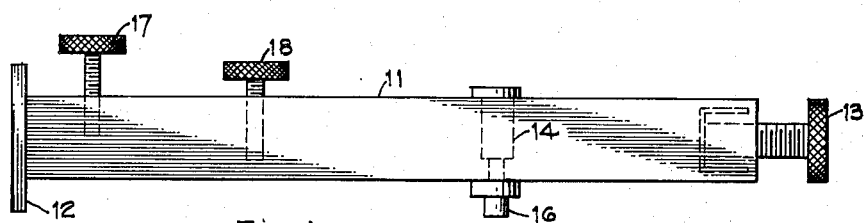
Figure 1 is an illustration of a conventional type of tuned wave guide crystal rectifier used for dection of microwaves.

Fig. 1 depicts a crystal rectifier contained in a closed-end hollow wave guide 11 having a coupling flange 12 at the open end and an adjustable short-circuiting plug 13 terminating and closing the other end. This termination is mechanically intricate and is therefore laborious and inexpensive to construct. A sealed crystal rectifier unit 14 is inserted in the wave guide near the closed end and a terminal 16 is provided for connection of a direct-current or low-frequency meter to the rectifier unit. Two adjustable matching stubs

2

17 and 18 are provided in the guide between the open end and the crystal rectifier unit. The distance between the crystal rectifier unit and the short-circuiting plug is varied by adjustment of the latter and this adjustment is customarily considered as matching the reactive component of the crystal impedance. The resistive component of the crystal impedance is considered to be matched by adjustment of either stub 17 or stub 18, selection of the proper stub being made by trial and error.

The functions of these three adjustments are ordinarily considered to be to secure the maximum response from the crystal rectifier, while adjusting the impedance looking into the wave guide detector unit at coupling 12 to appear like pure resistive impedance of value equal to the characteristic impedance of the wave guide employed. These adjustments are interdependent and they require readjustment whenever the crystal rectifier unit is replaced to rematch the new unit's different impedance.

Figure 2:
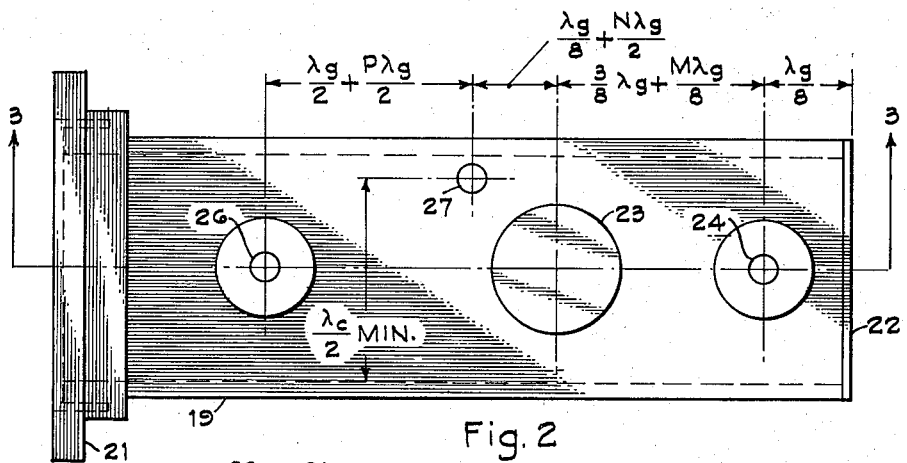
Figure 2 is a top view of the novel tuned wave guide crystal rectifier detector which is the subject of this invention.
Figure 3:
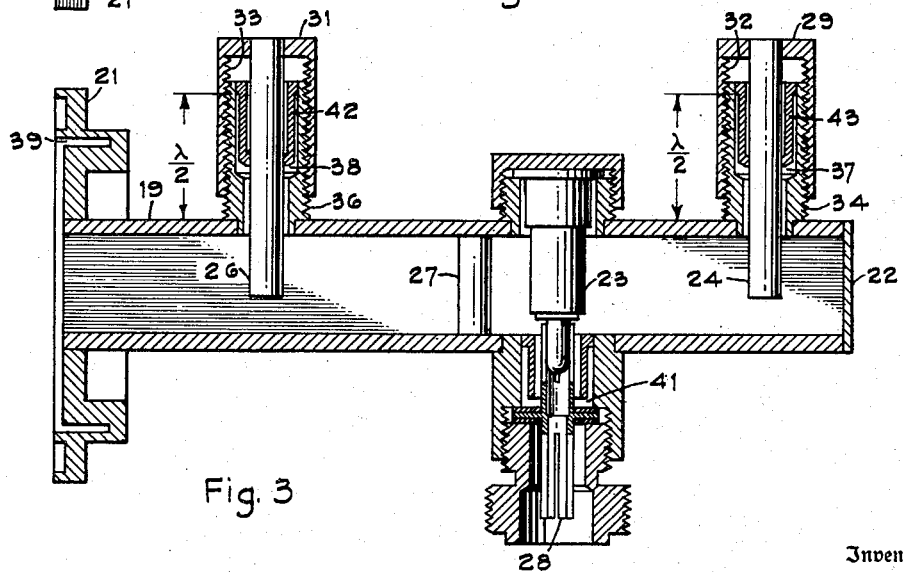
Figure 3 is a sectional view taken on the line 3—3 of Fig. 2.

The improved and preferred construction is disclosed in the top view of Fig. 2 and in cross section in Fig. 3, taken on line 3—3 of Fig. 2. These figures depict a closed-end hollow wave guide 19 of electrically conductive material with a coupling flange 21 on the open end and the other end closed by a rectangular brass plate 22. The guide illustrated is for approximately 3.20 cm. waves and is a rectangular brass tube 0.4 inch by 0.9 inch in internal cross section dimensions, but these dimensions, the wavelength and the material are for illustration only and may be whatever is desired for use in the microwave spectrum.

Referring to Figs. 2 and 3, the main elements of the detector comprise the hollow guide 19, a crystal rectifier 23, two adjustable matching stubs 24 and 26, and a short-circuiting rod 27. The two stubs and the short-circuiting rod are each made of round metal rod about ⅛ inch or one-tenth wavelength in diameter. The sharpness of tuning increases with decreasing diameter and decreases with increasing diameter, so that by selection of diameter the selectivity or sharpness of tuning of this detector may be varied within wide limits. With ⅛ inch stubs and rod, the detector can be employed with frequencies varying as much as 4% from that for which designed; with thinner stubs and rod a lesser variation of frequency is tolerated, and a greater variation with thicker stubs and rod.

The crystal rectifier unit is inserted through one of the broad faces of the guide at its longitudinal center line so as to extend across the guide in a direction perpendicular to the broad face with its smaller end projecting through the remaining broad face but without metallic contact thereto. A direct-current terminal 28 is provided which makes firm contact with the metallic terminal at the smaller end of the rectifier unit.

The two matching stubs are inserted perpendicularly through one broad face of the guide at its longitudinal center line, and the short-circuiting rod is inserted perpendicularly between the broad faces, conductively fastened to both and positioned between the longitudinal center line of the guide and either one of the narrow sides, at a distance to the other narrow side of not less than $\lambda_c/2$, where $\lambda_c$ is the cutoff wavelength for the particular mode of propagation desired, in this case the fundamental mode for rectangular wave guide ($TE_{1,0}$).

For most effective results the rectifier, matching stubs and short-circuiting rod should be spaced longitudinally in the guide with respect to the closed end thereof by distances which depend on the wavelength of the microwave energy in the guide, and which are expressed by the following formulas, but these distances may vary by as much as 20% without unduly affecting the action of the detector.

Distance from the closed end 22 of the guide to the axial center line of the rear matching stub 24:

$$\frac{\lambda_g}{8}$$

Distance from the axial center line of the rear matching stub 24 to the axial center line of the crystal rectifier 23:

$$\frac{3}{8}\lambda_g + \frac{M}{2}\lambda_g$$

Distance from a plane passed through the axis of the crystal rectifier 23 normal to the narrow side walls of the wave guide to a similar plane passed through the axis of the short-circuiting rod 27:

$$\frac{\lambda_g}{8} + \frac{N}{2}\lambda_g$$

Distance from the aforesaid plane passing through the axis of the short-circuiting rod 27 to a similar plane passing through the axis of the forward matching stub 26:

$$\frac{\lambda_g}{2} + \frac{P}{2}\lambda_g$$

wherein the letters M, N and P represent any positive integer including zero.

The matching stubs are each arranged to project into the guide for a distance continuously adjustable from zero to $\lambda/4$ where $\lambda$ is the wavelength which the microwave energy of the frequency employed would have in free space. Over this distance of projection such a stub presents a capacitive reactance to passing microwave energy, the amount of reactance depending on the length of projection, being zero at zero length and reflective at a length of $\lambda/4$.

At their outer ends the stubs 24 and 26 are rigidly fastened to the ends of cap members 29 and 31 having internal threads 32 and 33. Hollow studs 34 and 36 bearing external threads are rigidly fastened to the broad face of the guide so that by screwing the caps onto these studs the attached stubs 24 or 26 are advanced through the hollow centers of the studs into the interior of the guide. Each stud 34 and 36 has a wave trap, 37 and 38, consisting of a hollow cylindrical space surrounding the stub and extending from the inner surface of the guide into the stud for a distance of $\lambda/2$. This space being metallically terminated, a short-circuit or low impedance is reflected to the point where the stud passes through the plane of the inner surface of the guide, and insofar as the microwave energy is concerned the stud for that reason acts as if it were conductively connected to the guide at that point. Midway of the wave trap and therefore at a distance of $\lambda/4$ from its closed end the metal of the stud forms an annular spring 42 and 43 embracing the stub. The friction of this contact holds the stub in any position of adjustment, and being a high impedance point microwave energy cannot leak past.

Half wave slots are also employed in similar manner in the form of an annular groove 39 in the coupling flange 21 and as a folded annular groove 41 in the crystal rectifier direct-current output terminal 28 to provide low-impedance joints.

In operation, microwave energy entering the wave guide 19 at its open end should have a voltage antinode at the position of the crystal rectifier to produce the maximum effect therein, and should "see" an impedance which is purely resistive and equal to the characteristic impedance of the guide. The two caps 29 and 31 constitute the means of adjusting the interiorly-projecting lengths of the stubs 24 and 26 to accomplish these conditions simultaneously.

While the exact theory of operation is not known, tests indicate that regulation of stub 24 compensates for variations of reactance and produces an effect as it is inserted as if the conductive termination 22 were moved toward the rectifier 23. The adjustment of the stub 26 appears to compensate for variations in resistance of the rectifier crystal. When this stub 26 is withdrawn from within the guide it has no effect and the short-circuiting rod 27 produces the effect of a shunt inductive reactance. As the stub 26 is screwed into the guide it adds an effect of shunt capacitive reactance and this effect acts as if it were in the location longitudinally in the guide of the short-circuiting rod 27. As the stub 26 is screwed further in, it comes to a point where it exactly neutralizes the effect of the short-circuiting rod and beyond that point the net effect is capacitive.

The two stub adjustments will compensate for differences between individual rectifier crystals of a given design and also will permit compensation for variations of the microwave frequency employed from the design value, as mentioned previously. This construction thus permits adjustment to secure maximum effect and optimum impedance, therefore performing exactly the same functions with equal effect and greater facility than the three-adjustment detector of Fig. 1.

It is obvious that although a specific design of screw adjustment of the two tuning stubs has been described, any other design for moving the stubs into and out of the wave guide at the location described may be employed instead.

The impedance of the meter connected to the direct-current or low-frequency output terminal 28 of the crystal rectifier 23 has some effect on the tuning stub adjustments and any change in this impedance will require a tuning change. For instance, if the impedance of the measuring instrument connected to the terminal 28 of the detector is 100 ohms, and the tuning stubs are adjusted for maximum detection effect and minimum reflection, then a change of the impedance of the measuring instrument to 150 ohms will necessitate a retuning of at least one of the tuning stubs to regain optimum conditions of detection and reflection.

What is claimed is:

1. A microwave detector comprising, a wave guide section having an open end and a closed end, a crystal rectifier in said wave guide section intermediate said open and closed ends, a first adjustable capacitive reactance means for tuning positioned intermediate said crystal rectifier and said closed end, a second adjustable capacitive reactance means for tuning positioned intermediate said crystal rectifier and said open end and a short-circuiting rod rigidly and conductively fastened to opposite walls of said wave guide section and positioned with its axis more closely adjacent one of the side walls of said wave guide section than the other.

2. A microwave detector as defined in claim 1 in which said short-circuiting rod is positioned intermediate said second reactance means and said crystal rectifier.

3. A microwave detector as defined in claim 1 in which the axis of said first adjusting stub lies in a plane parallel to the plane of said closed end at a distance substantially $$\frac{\lambda_g}{8}$$

therefrom, $\lambda_g$ being the wavelength in the guide.

4. A microwave detector as defined in claim 3 in which the axis of said crystal rectifier lies in a plane parallel to the plane passed through the axis of said first adjusting stub at a distance substantially $$\frac{3\lambda_g}{8}+\frac{M\lambda_g}{2}$$

therefrom, the axis of said short-circuiting rod lies in a plane parallel to the plane passed through the axis of said crystal rectifier at a distance substantially $$\frac{\lambda_g}{8}+\frac{N\lambda_g}{2}$$

therefrom, and the axis of said second adjusting rod lies in a plane parallel to the plane passed through said short-circuiting rod at a distance substantially $$\frac{\lambda_g}{2}+\frac{P\lambda_g}{2}$$

therefrom, M, N and P being any integers including zero.

5. A microwave detector as defined in claim 4 in which the short-circuiting rod is so positioned relative to the side walls of said wave guide section that the distance from the axis of said short-circuiting rod to one of the said side walls is not less than $$\frac{\lambda_g}{2}$$

6. A microwave detector comprising, a wave guide section having an open end and a closed end, a crystal rectifier in said wave guide section intermediate said open and closed ends, a first adjustable matching stub located intermediate said crystal rectifier and said closed end, a second adjustable matching stub located intermediate said crystal rectifier and said open end and a short circuiting rod rigidly fastened to top and bottom walls of said wave guide section and positioned with its axis more closely adjacent one of the side walls of said wave guide section than the other.

7. A microwave detector as defined in claim 6 in which said short circuiting rod is positioned intermediate said second matching stub and said crystal rectifier.

8. A microwave detector as defined in claim 7 in which the axis of said first adjusting stub lies in a plane parallel to the plane of said closed end at a distance substantially $$\frac{\lambda_g}{8}$$

therefrom, the axis of said crystal rectifier lies in a plane parallel to the plane passed through the axis of said first adjusting stub at a distance substantially $$\frac{3\lambda_g}{8}+\frac{N\lambda_g}{2}$$

therefrom, the axis of said short-circuiting rod lies in a plane parallel to the plane passed through the axis of said crystal rectifier at a distance substantially $$\frac{\lambda_g}{8}+\frac{N\lambda_g}{2}$$

therefrom, the axis of said second adjusting rod lies in a plane parallel to the plane passed through said short-circuiting rod at a distance substantially $$\frac{\lambda_g}{2}+\frac{N\lambda_g}{2}$$

therefrom; where $\lambda_g$ is the wavelength in the guide, and N is any positive integer including zero.

9. A microwave detector as defined in claim 8 in which the short-circuiting rod is so positioned relative to the side walls of said wave guide section that the distance from the axis of said short-circuiting rod to one of said side walls is not less than $\lambda_c/2$ where $\lambda_c$ is the cutoff wavelength for a particular mode of propagation.

JOHN F. ZALESKI.

References Cited in the file of this patent

UNITED STATES PATENTS

| Number | Name | Date |
| --- | --- | --- |
| 2,419,613 | Webber | Apr. 29, 1947 |
| 2,427,100 | Kihn | Sept. 9, 1947 |
| 2,432,093 | Fox | Dec. 9, 1947 |
| 2,438,119 | Fox | Mar. 23, 1948 |
| 2,501,052 | Herlin | Mar. 21, 1950 |
| 2,547,378 | Dicke | Apr. 3, 1951 |
| 2,563,613 | Ohl | Aug. 7, 1951 |
| 2,588,103 | Fox | Mar. 4, 1952 |